United States Patent [19]
Webb et al.

[11] Patent Number: 5,930,410
[45] Date of Patent: *Jul. 27, 1999

[54] METHOD AND APPARATUS FOR OBTAINING MULTIPLE VIEWS FROM ONE SCAN WINDOW

[75] Inventors: Steven L. Webb, Loveland; Nancy Mundelius, Greeley; Margaret M. Sturgill; Irene F. Stein, both of Ft Collins; Darwin A. DeVore, Loveland, all of Colo.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/782,728

[22] Filed: Jan. 13, 1997

[51] Int. Cl.⁶ ........................................................ G06K 9/20
[52] U.S. Cl. ............................................................. 382/312
[58] Field of Search ..................................... 382/128, 131, 382/153, 154, 284, 312, 313, 317, 318, 319, 321, 322, 323, 324; 358/473, 474; 348/50, 97, 98, 99, 100, 101, 195, 207

[56] References Cited

U.S. PATENT DOCUMENTS

| | | |
|---|---|---|
| 4,463,380 | 7/1984 | Hooks, Jr. .............................. 382/284 |
| 4,835,532 | 5/1989 | Fant ........................................ 382/284 |
| 5,016,173 | 5/1991 | Kenet et al. ............................ 382/285 |
| 5,063,603 | 11/1991 | Burt ....................................... 382/115 |
| 5,435,310 | 7/1995 | Sheehan et al. ....................... 382/128 |
| 5,471,541 | 11/1995 | Burtnyk et al. ........................ 382/153 |
| 5,485,528 | 1/1996 | Horn et al. ............................. 382/131 |

*Primary Examiner*—Jose L. Couso
*Attorney, Agent, or Firm*—Cynthia S. Deal

[57] ABSTRACT

A computer operable method for implementing multiple views from a single scan window following a scanning process of an image scanner, the method involves designating the number of views to be obtained from the single scan window; designating the data type and other parameters for each of the number of designated views to be obtained from the single scan window; designating the number of views to be sent from the image scanner to a host computer; once a window has been scanned one or more times, generating a data signal representative of each of the number of views designated to be obtained from the single scan window; and sending each of the data signals representative of the number of views designated to be send from the image scanner to the host computer for further processing. The computer operable method may be implemented in scanner command language (SCL).

3 Claims, 5 Drawing Sheets

METHOD AND APPARATUS FOR OBTAINING MULTIPLE VIEWS FROM ONE SCAN WINDOW

FIELD OF THE INVENTION

The present invention relates generally to the field of optical scanners and more particularly to a system and method for obtaining multiple views from one scan window. In particular, this invention provides for mote than one view of sets of scan data to be obtained from a single scan window.

BACKGROUND OF THE INVENTION

Optical scanners are used to capture and digitize images. For example, an optical scanner can be used to capture the image of printed matter on a sheet of paper. The digitized image can then be electronically stored and/or processed with character recognition software to produce ASCII text. Most optical scanners use illumination and optical systems to illuminate the object and focus a small area of the illuminated object, usually referred to as a "scan line," onto the optical photosensor array. The entire object is then scanned by sweeping the illuminated scan line across the entire object, either by moving the object with respect to the illumination and optical assemblies or by moving the illumination and optical assemblies relative to the object.

A typical scanner optical system will include a lens assembly to focus the image of the illuminated scan line onto the surface of the optical photosensor array. Depending on the particular design, the scanner optical system may also include a plurality of mirrors to "fold" the path of the light beam, thus allowing the optical system to be conveniently mounted within a relatively small enclosure.

While various types of photosensor devices may be used in optical scanners, a commonly used sensor is the charge coupled device or CCD. As is well-known, a CCD may comprise a large number of individual cells or "pixels," each of which collects or builds-up an electrical charge in response to exposure to light. Since the size of the accumulated electrical charge in any given cell or pixel is related to the intensity and duration of the light exposure, a CCD may be used to detect light and dark spots on an image focused thereon. In a typical scanner application, the charge built up in each of the CCD cells or pixels is measured and then discharged at regular intervals known as exposure times or sampling intervals, which may be about 5 milliseconds or so for a typical scanner. Since the charges (i.e., image data) are simultaneously collected in the CCD cells during the exposure time, the CCD also includes an analog shift register to convert the simultaneous or parallel data from the CCD cells into a sequential or serial data stream.

A typical analog shift register comprises a plurality of "charge transfer buckets" each of which is connected to an individual cell. At the end of the exposure time, the charges collected by each of the CCD cells are simultaneously transferred to the charge transfer buckets, thus preparing the CCD cells for the next exposure sequence. The charge in each bucket is then transferred from bucket to bucket out of the shift register in a sequential or "bucket brigade" fashion during the time the CCD cells are being exposed to the next scan line. The sequentially arranged charges from the CCD cells may then be converted, one-by-one, into a digital signal by a suitable analog-to-digital converter.

In most optical scanner applications, each of the individual pixels in the CCD are arranged end-to-end, thus forming a linear array. Each pixel in the CCD array thus corresponds to a related pixel portion of the illuminated scan line. The individual pixels in the linear photosensor array are generally aligned in the "cross" direction, i.e., perpendicular to the direction of movement of the illuminated scan line across the object (also known as the "scan direction"). Each pixel of the linear photosensor array thus has a length measured in the cross direction and a width measured in the scan direction. In most CCD arrays the length and width of the pixels are equal, typically being about 8 microns or so in each dimension.

The sampling rate in the cross direction is a function of the number of individual cells in the CCD. For example, a commonly used CCD photosensor array contains a sufficient number of individual cells or pixels to allow a sampling rate in the cross direction of about 600 pixels, or dots, per inch (600 ppi), which is referred to herein as the native sampling rate in the cross direction.

The sampling rate in the scan direction is inversely related to the product of the scan line sweep rate and the CCD exposure time (i.e., the sampling interval). Therefore, the sampling rate in the scan direction may be increased by decreasing the scan line sweep rate, the CCD exposure time, or both. Conversely, the sampling rate in the scan direction may be decreased by increasing the scan line sweep rate, the CCD exposure time, or both. The "minimum sampling rate in the scan direction" for a given exposure time is that sampling rate achieved when scanning at the maximum scan line sweep rate at that exposure time. For example, a maximum scan line sweep rate of about 3.33 inches per second and a maximum exposure time of about 5 milliseconds will result in a minimum sampling rate in the scan direction of about 60 ppi.

Currently, optical character recognition (OCR) requires 300 ppi sampling rates for accurate results. Thus, a 300 ppi 4 bit gray scan (8.5×11), which is high resolution, low bit depth, is approximately 4.2 Megabytes. Color fidelity requires a 24 bit color scan. Thus, a 150 ppi 24 bit color scan (8.5×11), which is low resolution, high bit depth, is approximately 6.3 Megabytes. In order to provide a scan of a document that has both color pictures or drawings and writing requiring OCR, the scan would have to be approximately 300 ppi at 24 bits (8.5×11) which corresponds to 25.24 Megabytes of memory. Accordingly, to scan a document that includes both text and pictures would require quite a bit of memory. Yet, the software on the computer will down sample the color image to approximately 6.3 Megabytes and throw away the color image to obtain the text. This process is extremely slow to perform in software and unnecessarily consumes a great deal of memory. Another alternative is to first scan either the text or the graphics and then perform a scan of the other. Then the document could be regenerated by software. However, this is also a very time consuming method of scanning the document, besides using a lot of memory as well.

Accordingly, it would be desirable to provide a scanner that is able to scan a document containing both text and graphics, and greatly reduce the total amount of data being sent from the scanner to the host computer (which is currently a speed constraint), and reduce the total amount of data being stored and processed by the host computer software.

SUMMARY OF THE INVENTION

The above and other aspects of the present invention are accomplished in a multiple image scanner that performs a single scan of a document containing multiple types of images (e.g., text and graphics) and send multiple renditions of the same document from the scanner to the host computer (e.g., one high resolution gray scale image, and one low resolution high bit depth color image), thus greatly reducing the total amount of data sent to and processed by the host computer, for example, from approximately 25.24 Megabytes to approximately 10.5 Megabytes (a 300 ppi 4 bit gray image [8.5×11] that is 4.2 Megabytes and a 150 ppi 24 bit color [8.5×11] that is 6.3 Megabytes), which is a 2.4 to 1 reduction.

The scanner of the present invention may send the muliple images to the host computer interleaved on a line basis, for example, with two lines of high resolution gray data and then one line of low resolution color data, if the resolution ratio between the images was two. The advantage of the present invention is less information for the host software to process and store, and less information to be sent from the scanner to the host, which is a current limitation on scanner speed.

The present invention may further comprise host computer software that is capable of parsing the data stream of interleaved images into the individual images that are then ready for manipulation and further processing by the host computer.

The present invention may comprise a computer operable method for implementing multiple views from a single scan window following a scanning process of an image scanner, said method comprising the following steps: designating the number of views to be obtained from said single scan window; designating the data type and other parameters for each of the number of designated views to be obtained from said single scan window; designating the number of views to be sent from the image scanner to a host computer; once a window has been scanned one or more times, generating a data signal representative of each of the number of views designated to be obtained from said single scan window; and sending each of the data signals representative of the number of views designated to be send from the image scanner to the host computer for further processing, wherein said computer operable method is implemented in scanner command language.

BRIEF DESCRIPTION OF THE DRAWINGS

The above and other objects, features and advantages of the present invention will be better understood by reading the following more particular description of the invention, presented in conjunction with the following drawings, wherein.

DETAILED DESCRIPTION OF THE PREFERRED EMBODIMENT

The present invention provides a scanner that is capable of obtaining two sets of scan data simultaneously from a single scan. While the region of the scan is the same, the data types and resolutions of the two views can vary. For example, when a scan of a document is performed, an image processing unit in the scanner will generate one high resolution gray scale image and one low resolution 24 bit color image of the document scanned and then send both renditions of the scanned document to a host computer interleaved in a data stream, which the host computer will then parse in order to recreate the two views of the scanned document.

Figure 1:
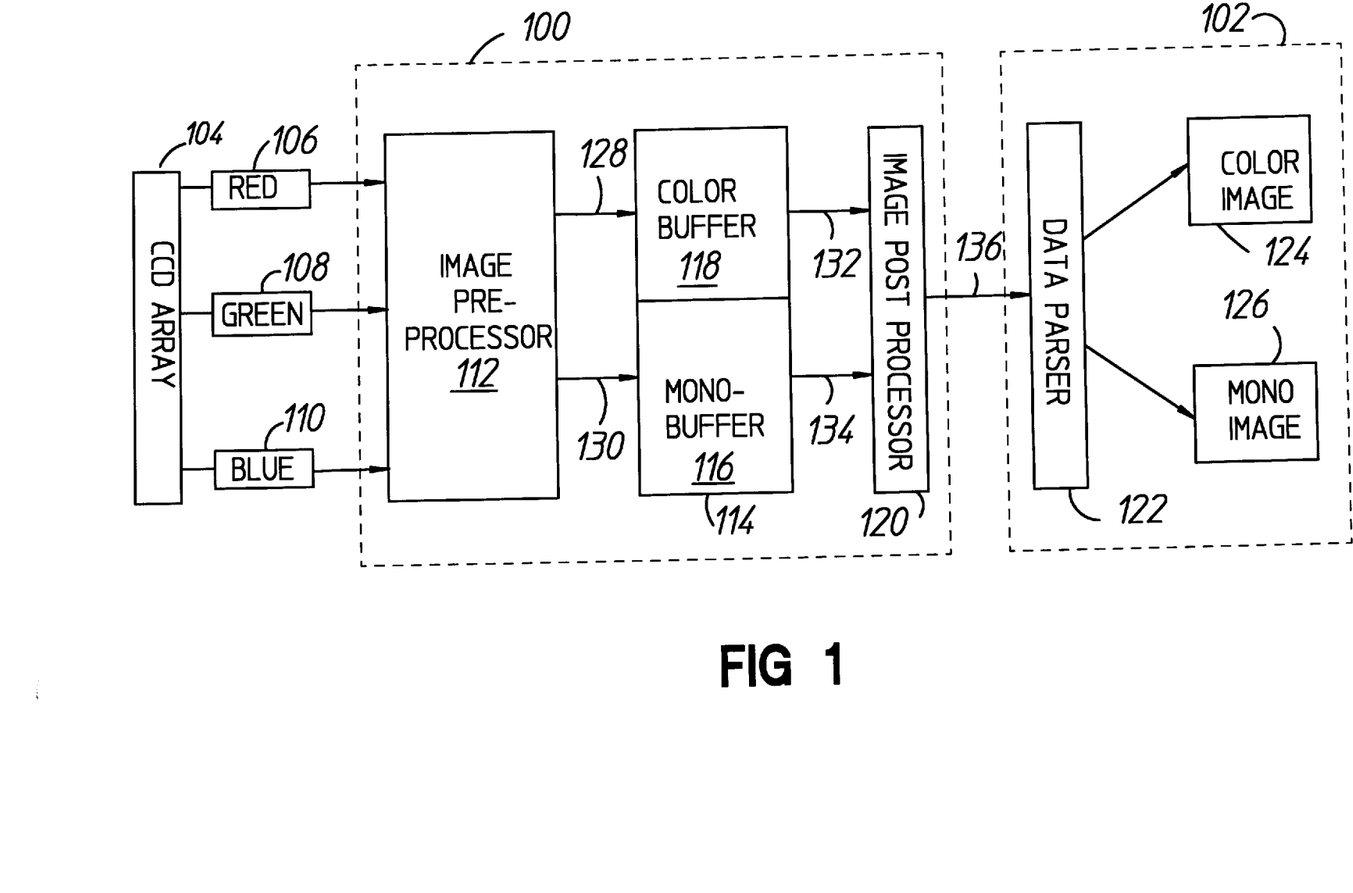
FIG. 1 shows a block diagram of the data path for a multiple image scanner according to the present invention.

FIG. 1 shows a block diagram of the data path for a dual image scanner with dashed line area 100 being scanner functions implemented by an image processeing unit and dashed line area 102 being host computer functions. It should be noted that although the embodiment being described herein is a dual image scanner comprising a black and white and a color image, the concepts are extensible to multiple images. Image processing unit 100 is implemented in an ASIC with functional details described below with respect to FIGS. 2 and 3. When a document is scanned, a CCD array 104 or other known photosensor device outputs a red data signal 106, a blue data signal 108 and a green data signal 110. These three data signals are then converted into a color image data signal 128 and a monochrome image data signal 130 by an image pre-processor 112. The image pre-processor 112 places the color image data signal 128 into a color buffer portion 118 of buffer 114 and the monochrome image data signal 130 into a monochrome buffer portion 116 of buffer 114.

Next the image post-processor 120 uses the image data in the color buffer 118 and the monochrome buffer 116 to generate either 1 or 2 views of the window scanned by the scanner as specified by the host computer. If two views are generated, the image post-processor will send the two views to the host computer in an interleaved data stream 136.

When the host computer receives the two views of the scan window, a data parser 122 will parse the data stream 136 into a color image 124 and a monochrome image 126. The two views are then ready to be manipulated by the host computer. The advantage is less information for the host software to process and store, and less information to be sent from the scanner to the host, which is a current limitation on the speed of scanners.

I. MULTIPLE IMAGE SCANNER

The dual image scanner reduces the data required to be sent from the scanner to the host computer for complete page (text and graphics/image) information with one scan. Currently optical character recognition requires 300 ppi sampling rates for accurate results. For color fidelity, a 24 bit color scan is required. In order to do this, the typical scan would be 300 ppi at 24 bits (8.5×11), which is 25.24 Megabytes. By letting the scanner send two renditions of the same page, one high resolution gray scale image, and one low resolution 24 bit color image, the total amount of data sent to and processed by the host software is greatly reduced. A 300 ppi 4 bit gray (8.5×11) is approximately 4.2 Megabytes and a 150 ppi 24 bit color (8.5×11) is approximately 6.3 Megabytes for a total of 10.5 Megabytes, which is approximately a 2.4 to 1 reduction in data.

The multiple image scanner of the present invention has an image processing unit which performs the above operations very fast. The image processing unit may be implemented in a conventional field programmable gate array, an ASIC or the like, using verilog, for example with the function description provided herein. The image processing unit of the multiple image scanner comprises the image pre-processor 112, buffer 116 and image post-processor 120, which are described in more detail below.

A. Image Pre-Processor

Figure 2:
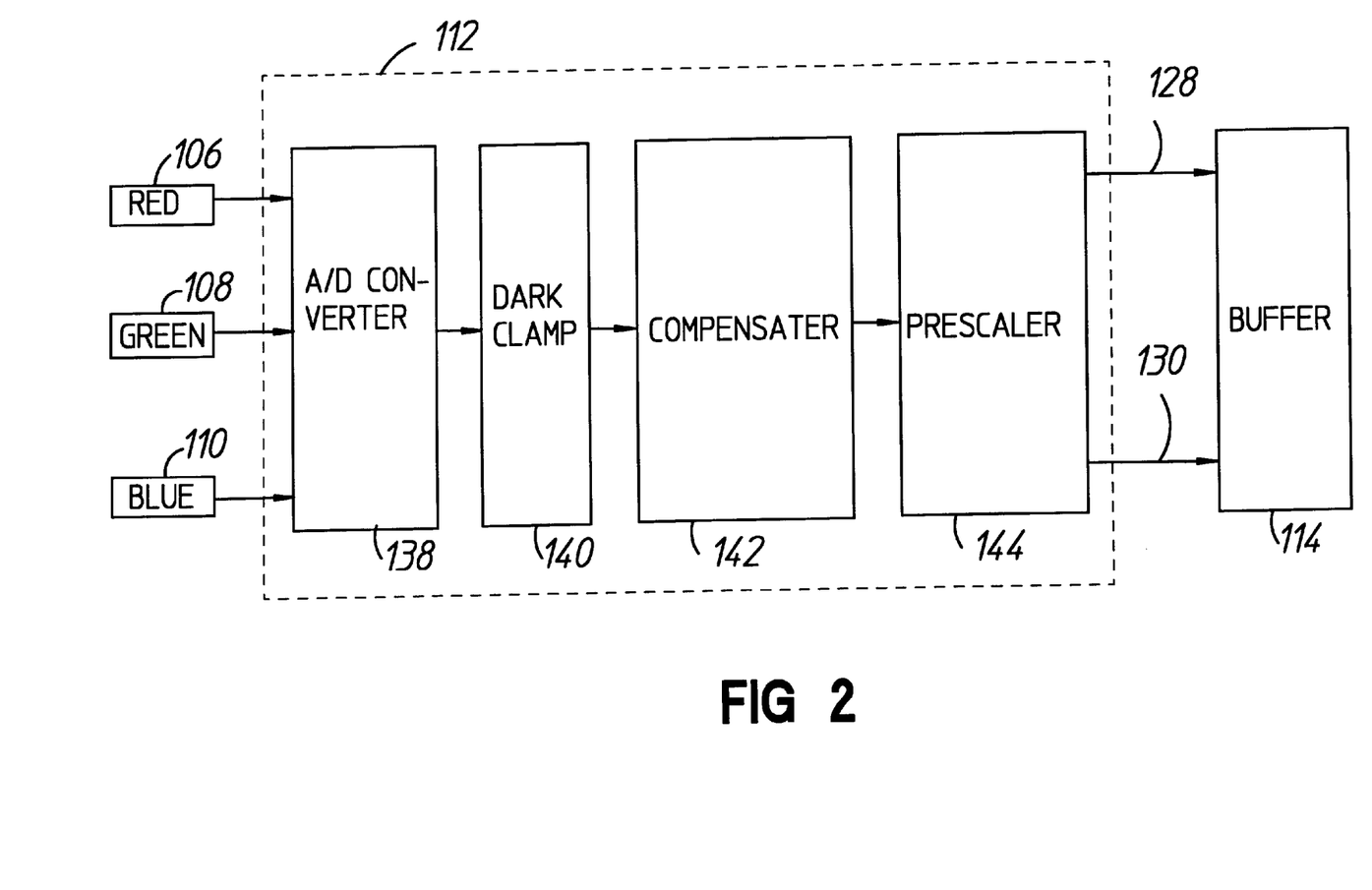
FIG. 2 shows a more detailed block diagram of the data path of the image pre-processor for a multiple image scanner according to the present invention.

Referring to FIG. 2, the image pre-processor 112 takes the RGB (red 106, green 108 and blue 110) image data from the CCD 104 and places either one or two different representations of that image into the buffer 114. One of the possible representations is a color image and the other is a monochrome image which is generated by selecting only one of the three color channels (red, green, or blue). The two different buffer images have the same y resolution but can have different x resolutions and bit depths. The bit depth of each image can be selected to be either 12-bit or 8-bit and the x resolution can be the CCD resolution divided by any integer factor from 1 to 63. The CCD resolution is the same for both images and can be either 300 ppi or 150 ppi. For example, the image pre-processor 112 can be programmed to put 300 ppi (x) by 300 ppi (y) 8-bit monochrome (green channel) data and 100 ppi (x) by 300 ppi (y) 12-bit color data into the buffer. Note that both images do not need to be generated. The pre-processor can be programmed to generate only the color representation or only the monochrome representation or both.

The four main functions performed by the image preprocessor of the present invention are described in greater detail below and with reference to FIGS. 1 and 2.

1. A/D Converter

The A/D convertor takes the 300 ppi or 150 ppi analog RGB image data from the CCD array and converts either 1 of the 3 or all 3 color values for each pixel to 10-bit digital numbers. These digital values are padded to 12 bits and sent to the dark clamp.

2. Dark Clamp

The dark clamp subtracts the average dark current for the line from each pixel value. Pixels inside the desired scan window are then sent to the compensator.

3. Compensator

The compensator removes pixel variations caused by non-uniform illumination and CCD response. Compensated pixel values are then sent to the prescaler.

4. Prescaler

The prescaler splits the compensated pixel values into a monochrome image and a color image, reduces the x-resolution of each image by a different integer factor, and puts one or both of the resulting images into the buffer. The prescaler splits the image data from the compensator into a monochrome stream and a color stream, reduces the x-resolution of each stream by a different integer factor, and then stores one or both of the resulting streams in the buffer. This is done to minimize the amount of buffer space consumed by each line of image data, especially when 2 views are requested by the host. For example, if no prescaler were provided and the host requested a 300 ppi monochrome view and a 100 ppi color view of an 8.5 inch wide scan window, each line of the image would consume 11.475 Kbytes of buffer space (8.5 inches 300 ppi 3 colors/pixel 1.5 bytes/color). However, with the prescaler each line consumes only 6.375 Kbytes (8.5 inches 300 ppi 1 color/pixel+8.5 inches 100 ppi 3 colors/pixel 1.5 bytes/color).

Note that the prescaler can either place full 12-bit or truncated 8-bit data into the buffer. The data width can be specified independently for each stream. The prescaler reduces the x-resolution of the 2 data streams by averaging adjacent pixels together rather than simply dropping pixels. This effectively lowpass filters the image data before it is resampled at the lower resolution and helps reduce aliasing. The prescaler can reduce x-resolution by any integer factor between 1 and 63.

B. Image Post-Processor

The image post-processor uses the image(s) in the buffer to generate either 1 or 2 views of the scan window specified by the host. Each view is generated from either the color image or the monochrome image. The two views can be generated from the same or different images. For example, one view could be generated from the color image and the other view from the monochrome image OR both views could be generated from the color image OR both views could be generated from the monochrome image. The two views can have different y resolution but the y resolution of each view must be the buffer y resolution divided by an integer factor from 1 to 16. The two views can also have different x resolutions which can be any resolution form ¼ to 2× the x resolution of the buffer image from which the view is generated. Each view can also have different matrices, tonemaps, data types, etc. (with some restrictions which will be covered in greater detail below).

When two views are enabled, the views will be sent out interleaved on a line basis dependent on the ratio of their y resolutions. For example, if view one's y resolution is 300 and view two's y resolution is 150, then the data would alternate with two lines of view one's image data and then one line of view two's image data (except at the beginning). Other examples of interleaved data as a ratio of y resolution:
(2 to 1 ratio)→output 300 to 150 ratio: 300, 150, 300, 300, 150, 300, 300, 150 . . .
(1 to 2 ratio)→output 150 to 300 ratio: 150, 300, 300, 150, 300, 300, 150, 300 . . .
(3 to 1 ratio)→output 300 to 100 ratio: 300, 300, 100, 300, 300, 300, 100, 300, 300, 300 . . .
(1 to 3 ratio)→output 100 to 300 ratio: 300, 100, 300, 300, 300, 100, 300, 300, 300, 100 . . .
(4 to 1 ratio)→output 300 to 75 ratio: 300, 300, 75, 300, 300, 300, 300, 75, 300, 300 . . .
(1 to 4 ratio)→output 75 to 300 ratio: 300, 75, 300, 300, 300, 300, 75, 300, 300, 300 . . .
(5 to 1 ratio)→output 300 to 60 ratio: 300, 300, 300, 60, 300, 300, 300, 300, 300, 60 . . .
(1 to 5 ratio)→output 60 to 300 ratio: 300, 300, 60, 300, 300, 300, 300, 300, 60, 300 . . .

Note, the above examples are merely exemplary; other possible ratios for the current implementaion go up to 1 to 9.

Figure 3:
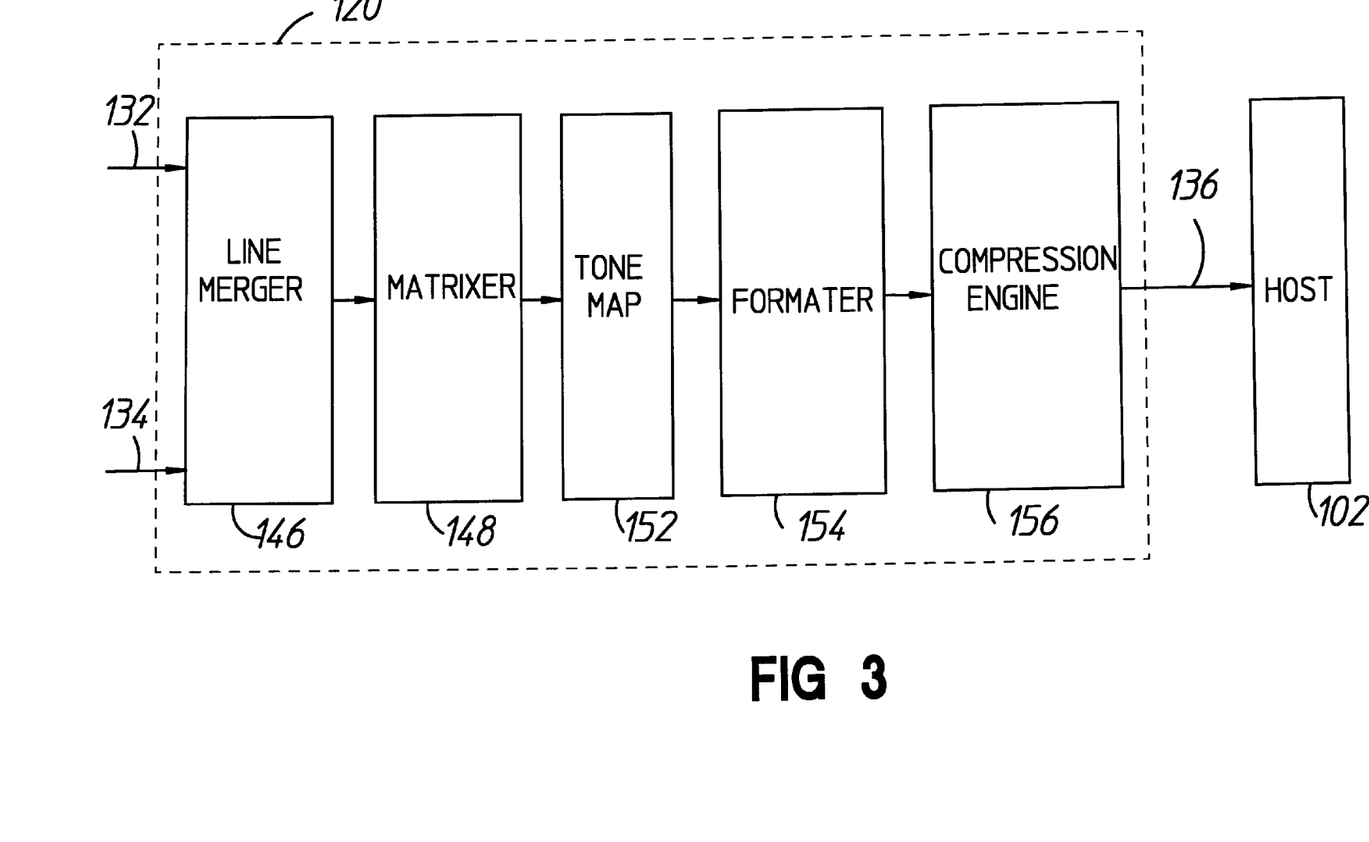
FIG. 3 shows a more detailed block diagram of the data path of the image post-processor for a multiple image scanner according to the present invention.

The six main operations performed by the image post-processor of the present invention are described in greater detail below and with reference to FIGS. 1 and 3.

1. Line Merger

The line merger reads 1 to 9 lines from the appropriate image (color or black and white), optionally averaging some lines together before sending the resulting lines to the matrixer. The line merger essentially interleaves the two or more renditions of the scanned image into a single interleaved data stream to be sent to the host computer. By interleaving the two or more renditions of the scanned image on a line-by-line basis, the scanner does not have to save all of any rendition, as all renditions are generated, interleaved and sent to the host computer real time—that is, on a somewhat line-by-line basis.

The line merger reads 1 to 9 lines of data from either the color image or the black and white image and averages some of the lines together to reduce the number of computations that must be done by the matrixer. In addition, the line merger can provide a simple form of y resolution prescaling by averaging additional adjacent lines together. For example, the line merger can read 9 lines from the buffer, average every 3 adjacent lines to reduce the effective y resolution by a factor of 3, average the two remaining outer lines for kernel symmetry, and then send the resulting 2 lines to the matrixer. Therefore, it has reduced the number of lines that must be processed by the matrixer from 9 to 2.

Any integer number of adjacent lines from 1 to N (where N is the number of lines read from the buffer—up to 9) can be averaged together. However, after adjacent lines have been averaged, the resulting number of lines must be 1, 3, 5, 7, or 9 so that symmetrical lines can be further averaged before being passed on to the matrixer. This means that if no adjacent lines are averaged, we can use either 1, 3, 5, 7, or 9 line kernels. However, if 2 or 3 adjacent lines are averaged, we can only use 1 or 3 line kernels. If 4 through 9 adjacent lines are averaged, we can only use a 1 line kernel.

Lines are averaged by adding the corresponding pixels of each line and dividing by a scale factor of 1, 2, 4, or 8. Therefore, exact averaging is obtained only when averaging together 1, 2, 4, or 8 lines. The line merger will overflow if the number of lines added together divided by the scale factor is greater than 2. Therefore, if 3, 5, 6, 7 or 9 line averaging is desired, the nearest lower scale factor should be used and the matrixer coefficients may need to be reduced to compensate for the extra "gain" introduced in the line merger. The only exception to this rule is when we are reading 9 lines from the buffer, averaging every adjacent 3 lines, and then using a 3 line kernel. In this case, the line merger will end up reducing 9 line to 2. One of these two lines (the one corresponding to the center of the kernel) will be obtained by adding the center 3 lines from the buffer. The other line will be obtained by adding the outer 6 lines from the buffer. However, only one divisor can be selected and must be selected such that no line coming out of the line merger has been multiplied by more than 2. Therefore, in this example, a divisor of 4 must be selected. Since the gain of the line merger is now ¾, the matrixer coefficients may need to be increased to compensate.

The buffer image to be used (color or monochrome), the number of lines read from that image, the number of adjacent lines averaged, and the scale factor can be specified independently for each view to be generated.

2. Matrixer

The matrixer "mixes" the three colors of each pixel to produce a single color or three new colors before sending the lines on to the tone mapper.

3. Tone Mapper

The tonemapper uses lookup tables and interpolation to adjust image contrast and intensity before sending the data to the formatter. The output pixels are further transformed by the tonemapper which passes them through a lookup table which contains a transfer curve called the tonemap. Tonemaps are used to perform gamma correction, adjust contrast and intensity, enhance shadows, etc.

4. Formater

The formatter optionally thresholds or dithers the data before packing it into the specified data width. This stage can also invert the data, if desired, before sending it to the compression engine.

5. Compression Engine

The compression engine optionally uses the packbits algorithm to compress the line of image data before sending it to the host.

II. MULTIPLE VIEWS FROM ONE SCAN WINDOW

The multiple image scanner of the present invention has the ability to obtain two images from a single scan. The scanner command language (SCL) implementation of multiple image separates the concept of the scan window with the particular view of that window. SCL is the command language used for scanners and is commonly known. It should be noted that any command language could be used. However, in the preferred embodiment, SCL is used to generate multiple views from one scan window. The scan window is the physical area of the page that will be scanned (defined by the x and y position and the extents). The view of that scan window is the data contained inside the physical area (defined by the resolution, data type, mirror, inverse, etc.). There are scanner settings that are window and view independent (i.e., is ADF attached, serial number, etc.). The advantage of separating the view and the window is that it makes the definition of multiple views extensible to multiple window with multiple views. No other scanner has multiple image abilities or an implementation of multiple views. It should be noted that although in the present implementation of multiple views, a single scan is used to obtain multiple views of the same document, it is irrelevant whether one or more scans are used to obtain multiple views of the same document. It does not matter how the data is obtained (from one or more scans), the important point is that the SCL implementation of more than one view allows different data to represent the same space.

In a preferred embodiment, the Hewlett-Packard ScanJet 5p is utilized to allow the acquisition of two views of data simultaneously. However, it should be noted that any color scanner from any manufacturer could be modified to implement the present invention. While the region of the scan is the same, the data types and resolutions of the two views can vary. The limits on the variables set on the two views are described with the SetViewType macro in SCL as follows:

```
INT16 DualScan(INT16 Phase,
    PUINT8 pBufferView0,
    INT32 LengthView0,
    PINT32 pReceivedView0,
    PUINT8 pBufferView1,
    INT32 LengthView1,
    PINT32 pReceivedView1);
```

The parameters are set as indicated below:

Phase—Flag indicating if this is the first transfer in a sequence. Must be one of the following values:

SL_FIRST or SL_SCAN, the first buffer in the transfer,

SL_ADF_SCAN, the first buffer in an ADF transfer (Currently only supported by HP1750A & HP5110A), SL_NEXT, each additional buffer transfer;

PbufferView0—Pointer to view 0 data buffer to receive the data;

LengthView0—Size of the view 0 data buffer in bytes;

pReceivedView0—Pointer to the actual number of bytes received from the scanner for view 0;

pBufferView1—Pointer to view 1 data buffer to receive the data;

LengthView1—Size of the view 1 buffer in bytes;

pReceivedView1—Pointer to the actual number of bytes received from the scanner for view 1.

This function is nearly identical to the Scan( ) function, which is well known to those familiar with SCL, except that it supports the dual view mode of the scanner.

Some of the default settings for the two views of a scan are shown below in Table 1.

| Parameter | Default: Image One | Default: Image Two |
|---|---|---|
| Data Type | 0 (b/w threshold) | 5 (color) |
| Data width | 1 bit/pixel | 24 bits/pixel |
| B/W Dither Pattern | 0 (coarse fatting) | 0 (coarse fatting) |
| Coefficient Matrix | 2 (green only) | 0 (NTSC color) |
| Tone Map | 0 (contrast/intensity) | 0 |
| Intensity | 0 | 0 |
| Contrast | 0 | 0 |
| Mirror | 0 (off) | * |
| Auto Background | 0 (off) | * |
| Inverse Image | 0 (off) | 0 (off) |
| X Resolution | 300 ppi | 100 ppi |
| Y Resolution | 300 ppi | 100 ppi |
| X Scale Factor | 100% | 100% |
| Y Scale Factor | 100% | 100% |
| X Location | 0 | * |
| Y Location | 0 | * |
| X Extent | 2550 (pixels) | * |
| Y Extent | 3300 (pixels) | * |
| Lamp | 0 (off) | * |
| Scan Bar Position | stops where it is | * |
| Download Type | 0 (b/w dither pattern) | 0 (b/w dither pattern) |
| Downloaded 8 × 8 B/W Dither Pattern | none (old pattern is erased) | * |
| Downloaded 8 bit Tone Map | none (old map is erased) | * |
| Downloaded Color Matrix | none (old matrix is erased) | * |
| Downloaded Calibration Strip Parameter | none (old parameters erased) | * |
| Downloaded 16 × 16 B/W Dither Pattern | none (old pattern is erased) | * |
| Downloaded B/W Matrix | none (old matrix is erased) | * |
| Downloaded 10 bit Color Matrix | none (old parameters erased) | * |
| Downloaded RGB tone maps | none (old parameters erased) | * |
| Downloaded B/W tone maps | none (old parameters erased) | * |
| Downloaded RGB gains | none (old parameters erased) | * |
| Calibration Y-Start | −1 (white strip) | * |
| Calibration Strip parameters | 0 (auto-select) | * |
| Calibration Mode | 0 (auto--calibration dependent on data width) | * |
| Speed Mode | 0 (auto) | * |
| Compression | 0 (off) | 0 (off) |
| Select number views | 1 | NA |
| Selected view | 1 (off) | NA |
| Calibration Strip Lower | 0 (calculated) | * |
| Max. # Lines per Buffer | 0 (use calculated) | * |

In the above table "*" indicates that the parameter is not set independently for the two views. However, this could be modified to allow some or all of these parameters to be independently set for the two views. Also, these parameter settings and SCL commands reflect the implementation used by the inventors and is not intended to be the only possible combination of parameter settings or SCL commands that could enable the multiple views from a single scan concept of the present invention.

The following commands have been added to select the number of views to be sent by the scanner to the host computer:

Command: Select Number of Views
Escape Sequence: Esc*f#A
Inquire ID: 10466
Range: 1–2
Default: 1

Macro: SetNumberofViews(x)
Send Command: SendCommand(SL_NUM_OF_VIEWS,x)

Where x can be either 1 or 2.

This command will select how many views of the window will be sent by the scanner. The default will be one. The present implementation supported values are 1=one view, 2=two views. When two views are enabled, the data for the two views will be sent out interleaved on a line basis dependent on the ration of their Y resolutions. For example, if view one's Y resolution was 300 and view two's Y resolution was 150, then the data would alternate with two lines of view one's image and then one line of view two's image (except at the start; see examples above in the image post-processor section).

The select view command is used to set scanner settings for the view or views you want to work with as follows:

Command: Select view
Escape Sequence: Esc*f#B
Inquire ID: 10467
Range: 0–1
Default: 0

Macro: SetViewType(x)
SendCommand: SendCommand(SL_VIEW_TYPE, x)
Where x can be: 0—for view one, or 1—for view two.

The view must be selected prior to choosing the scanner settings. This command selects which view the subsequent SCL commands or inquires refer to. Supported values are: 0(view one) and 1(view two). The default is view one.

III. METHOD FOR PARSING MULTIPLE IMAGE SCAN DATA

Host computer software parses the interleaved multiple image data sent by the scanner. In the present implementation, the software program DualScan and its supporting modules permit a user unfamiliar with the details of the multiple image data format to easily parse multiple image data from the scanner into familiar tiff files, which can then be used with programs such as Photo Shop. DualScan is a software program sold by Hewlett-Packard Co. It is possible that one or both of the images will contain compressed data further complicating the parsing issue. The DualScan software allows use of a scanner with multiple image capability in its hardware by parsing the interleaved data stream received from the scanner. One skilled in the art could readily expand DualScan to include the parsing of multiple views of data, rather than the two views as described in the present implementation.

Figure 4:
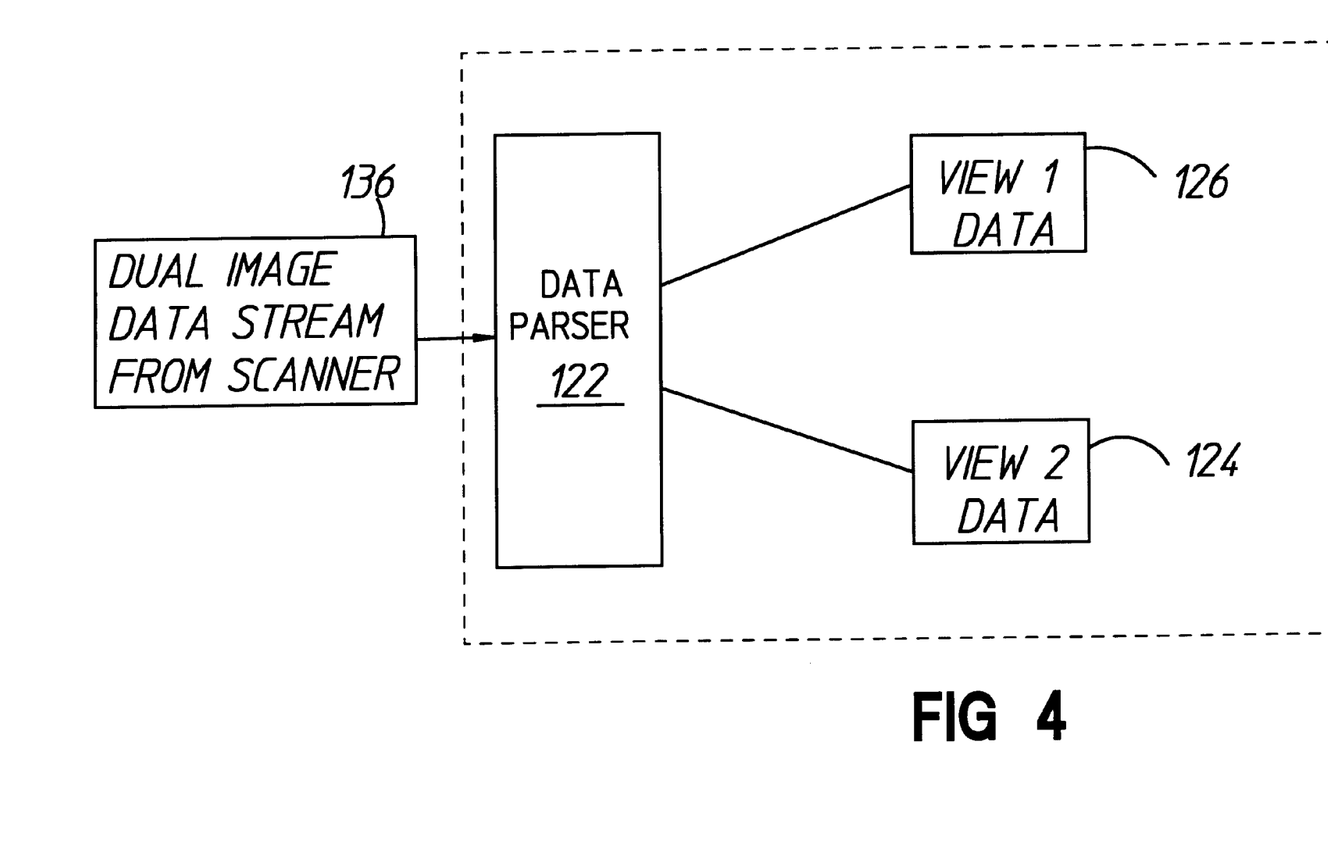
FIG. 4 shows a more detailed block diagram of the data path from the multiple image scanner to the host computer according to the present invention.

FIG. 4 is a block diagram of a dual image data stream 136 being sent from the scanner (not shown) and parsed by a data stream parser 122 on the host computer (not shown) into view 1 data (monochrome image) 126 and view 2 data (color image) 124. The operation of the data stream parser will be further explained with reference to FIG. 5, which is a flow chart of the data stream parsing function.

Figure 5:
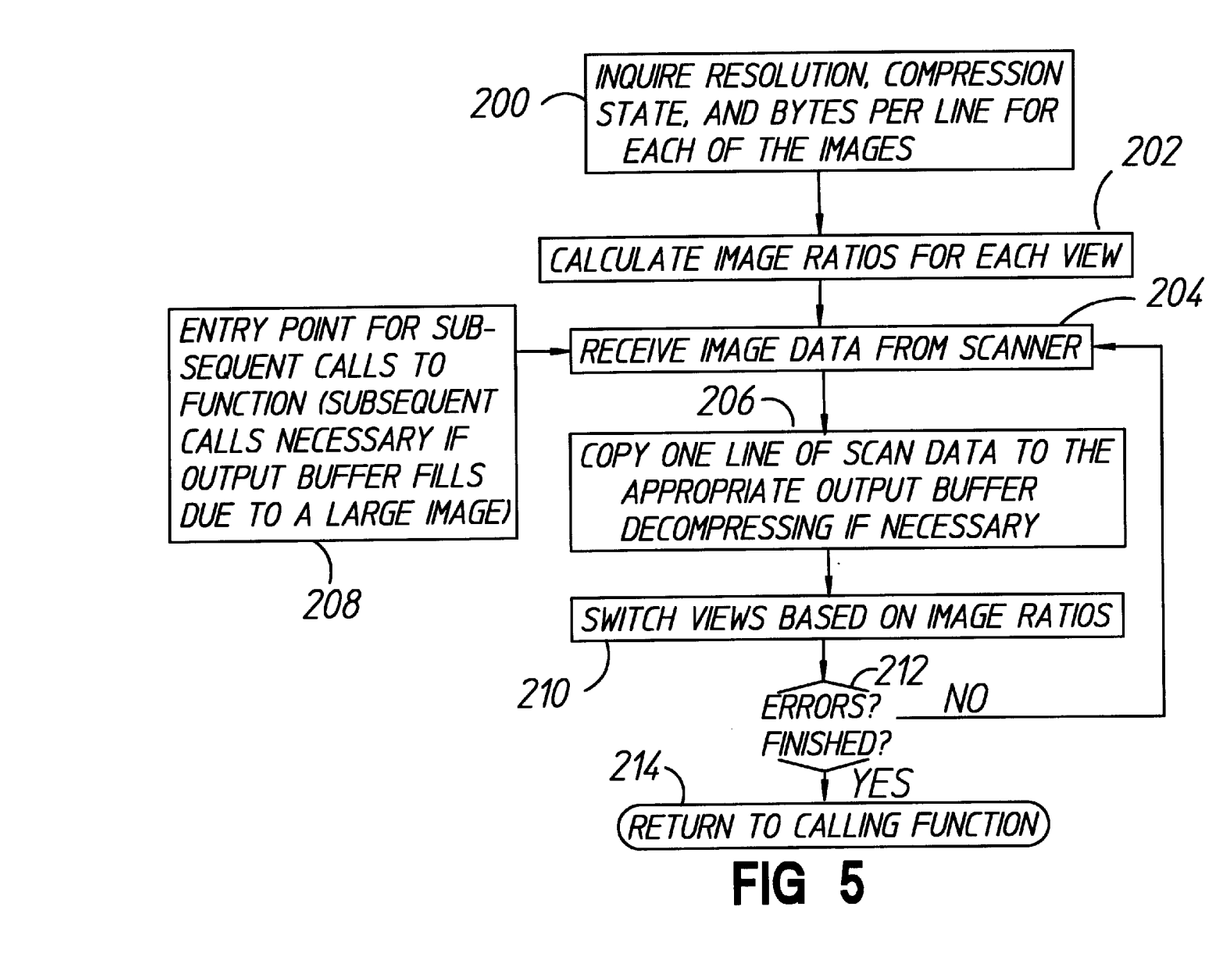
FIG. 5 shows a flow chart of a method of parsing a data stream containing more than one set of data according to the present invention.

At the initial entry point, the resolution, compression state, and bytes per line for each of the images is inquired by the data parser at 200. Next image ratios for each view are calculated by the data parser at 202. Then interleaved image data is received by the data parser from the scanner at 204. The data parser then copies one line of scan data to the appropriate output buffer, decompressing the data if necessary at 206. The data parser then switches views (210) based on the image ratios calculated at 202. If no errors are detected and the parsing of the data stream is not finished (212), the data parser returns to 204 and receives more interleaved data from the scanner to be parsed. If an error is detected or the parsing of the data stream is completed at 212, the data parser returns this status to the calling function which takes an appropriate action. Error conditions may include: (1) output buffers full, (2) bad response from the scanner, (3) decompression engine out of data and scanner has no more data, or (4) scan completed. The steps in FIG. 5 are also shown in source code in Appendix A.

It should be noted that although the implementation described herein describes a dual scan, dual views, and the parsing of two interleaved data streams, these concepts are readily extensible to multiple scan, multiple views, and the parsing of multiple interleaved data streams.

The foregoing description of the present invention has been presented for purposes of illustration and description. It is not intended to be exhaustive or to limit the invention to the precise form disclosed, and other modifications and variations may be possible in light of the above teachings. For example, the data stream parser is capable of parsing any interleaved data stream containing more than one set of data. The data stream does not have to be an scanned image data stream. Also, the SCL implementation of multiple views of the same window does not matter how the multiple views were obtained; the implementation is the same whether the views were obtained from one or more scans of the same area. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

APPENDIX A

```
INT16 FP DualScan(INT16 Phase,
    PUINT8 pBufferView0, INT32 LengthView0, PINT32 pReceivedView0,
    PUINT8 pBufferView1, INT32 LengthView1, PINT32 pReceivedView1)
/*
** Parameters:
**   Phase    Flag indicating if this is the first transfer in
**            a sequence. Can be one of the following values.
**            SL_FIRST or SL_SCAN, the first buffer in the transfer.
**            SL_ADF_SCAN, the first buffer in an adf transfer.
**            SL_NEXT, each additional buffer transfer.
**   pBufferView0     Pointer to view 0 data buffer to receive the data.
**   LengthView0      Size of the view 0 data buffer in bytes.
**   pReceivedView0   Pointer to the actual number of bytes
**            recieved from the scanner for view 0.
**   pBufferView1     Pointer to view 1 data buffer to receive the data.
**   LengthView1      Size of the view 1 data buffer in bytes.
**   pReceivedView1   Pointer to the actual number of bytes
**            recieved from the scanner for view 1.
** Globals:     None.
** Operation:   SL_ADF_SCAN ONLY SUPPORTED BY HP1750A and Domino !
**   This procedure is nearly identical to the "Scan()" function
**   except that it supports the dual view mode of the scanner.
**   [Please refer to the internal documentation for the "Scan()"
**   function for additional usage information!] This command is
**   only supported on scanners which supports dual view, such as
**   "Domino".
**
**   Note, that this routine is also capable of handling compressed
**   input data.
**
** Return:
**   status   OKAY, commands sent to scanner successfully.
**            SL_BADACCESS, transfer terminated in error.
**            SL_BADRESPONSE, inquire resulted in incorrect response.
**            SL_NULLRESPONSE, inquire resulted in NULL response.
**            SL_ILLEGALCMD, illegal command sent to scanner (scanner
**                may not support the SCL command).
**            SL_SCANERROR, compression scan error.
*/
{
    INT16   status = OKAY;
    INT16   num_views,      /* Number of views presently active */
    INT16   active_view;    /* Active view (0 or 1) on entry to */
                            /* this routine  */
    INT32   received = -1;  /* Amount of data actually received */
                            /* from the scanner (initialized */
                            /* -1 to test for.. */
    INT16   YRes_view0,     /* Y Resolution for views 0 and 1 */
            YRes_view1;
    INT16   ImageRatio_view0, /* Image Ratio for views 0 and 1 */
            ImageRatio_view1;
    static INT16  Compression_view0, /* Scan data compression flag for */
            Compression_view1; /* views 0 and 1   */
    static INT16  WidthBytes_view0, /* Width of single scan line in */
            WidthBytes_view1; /* bytes for view 0 and 1   */
```

APPENDIX A

```
    static INT16   cur_view;    /* Current view being processed */
    static INT16   view_count[2];
    static INT16   imageratio[2];
    static PUINT8  pScanBuffer;  /* Pointer to current location in */
                                 /* statically allocated input */
                                 /* scanbuffer              */
    static INT16   bytes_avail;    /* Number of bytes used available */
                                   /* (or free) in the input buffer */
/* Check to make sure we are processing dual image scan before proceeding */
    if(Phase != SL_NEXT)
    {
      status = InquireNumber (SL_VIEW_TYPE, SL_NOM, (PINT16) &active_view);
      if(status != OKAY)
           return (SL_ILLEGALCMD);
      /* Get applicable scan state information for view #0 (first view) */
      SetViewType (0);
      if( (status = InquireNumber(SL_NUM_OF_VIEWS, SL_NOM, &num_views) != OKA
Y)||
          (num_views != 2)||
          (status = InquireNumber(SL_Y_RESOLUTION, SL_NOM, &YRes_view0) != OK
AY)||
          (status = InquireNumber(SL_COMPRESSION, SL_NOM, &Compression_view0)
!= OKAY)||
          (status = InquireNumber(SL_BYTES_PER_LINE, SL_NOM, &WidthBytes_view
0) != OKAY))
             return (SL_ILLEGALCMD);
      /* Now get the same information for view #1 (second view) */
      SetViewType (1);
      if( (status = InquireNumber(SL_Y_RESOLUTION, SL_NOM, &YRes_view1) != OK
AY)||
          (status = InquireNumber(SL_COMPRESSION, SL_NOM, &Compression_view1)
!= OKAY)||
          (status = InquireNumber(SL_BYTES_PER_LINE, SL_NOM, &WidthBytes_view
1) != OKAY))
             return (SL_ILLEGALCMD);
      /* Compute the Y image ratios for each view using the Y Resolutions */
      if (YRes_view0 <= YRes_view1)
      {
         ImageRatio_view0 = 1;
         ImageRatio_view1 = YRes_view1 / YRes_view0;
#ifndef VORTEX_WORKAROUND
         view_count[0] = 0;
         view_count[1] = ((INT16) ((ImageRatio_view1 / 2) + 1))
                         % ImageRatio_view1;
         if(view_count[1] == 0)    /* Special case: 1:2 ratio */
            cur_view = 0;  /* Set starting view */
         else cur_view = 1;
#endif
      }
      else
      {
         ImageRatio_view0 = YRes_view0 / YRes_view1;
         ImageRatio_view1 = 1;
#ifndef VORTEX_WORKAROUND
         view_count[0] = (INT16) (ImageRatio_view0 / 2);
         view_count[1] = 0;
         cur_view = 0;      /* Set starting view */
#endif
      }
#ifdef VORTEX_WORKAROUND
    /* Initialize view output counters (for supporting image ratios) */
    view_count[0] = 1;     /* = ImageRatio_view0 - 1; */
                           /* (for final Vortex release) */
    view_count[1] = ImageRatio_view1;
    cur_view = 0;       /* Set starting view */
#endif
      imageratio[0] = ImageRatio_view0;
      imageratio[1] = ImageRatio_view1;
      /* Reset view to initial active view when this routine was entered */
      SetViewType (active_view);
      /* Initialize pointer to scan input buffer */
      pScanBuffer = (PUINT8) &ScanBuffer;
    } /* if (Phase != SL_NEXT) */
/* Initialize the actual number of bytes received for both views.
 *
 * Note: While these 2 function return arguments are initialized within
 *   this routine, they are actually set within another function,
 *   "CopyScanLine()", called by this routine.
```

APPENDIX A

```
*/
  *pReceivedView0 = 0;
  *pRecievedView1 = 0;
/* Make sure the scanner is communicating and clean up the error state */
  if (Phase == SL_NEXT
     ||((status = InquireOldestError()) != SL_BADACCESS
        && status != SL_BADRESPONSE && status != SL_NULLRESPONSE
        && (status = SendCommand(Phase, 0)) == OKAY))
{
  if ((Phase == SL_FIRST) || (bytes_avail == SCAN_BUFSIZE))
  {                        /* Force buffer to be filled */
        bytes_avial = SCAN_BUFSIZE;
        status = SCANBUFEMPTY;
  }
  while ( (status != OUTBUFFERFULL) && (status != SL_SCANERROR) &&
     (recieved != 0) )
  {
   /* Refill scan input buffer if necessary */
   if (status == SCANBUFEMPTY)
   {
     memmove (ScanBuffer, pScanBuffer, SCAN_BUFSIZE - bytes_avail);
     pScanBuffer = &ScanBuffer[SCAN_BUFSIZE - bytes_avial];
     received = RecFromScanner (pScanBuffer, bytes_avail, SL_ALLCHAR)
;
     if (received < 0)     /* Error in reading scan data */
     {
       *pReceivedView0 = 0;
       *pReceivedView1 = 0;
       return (SL_BADACCESS);
     }
#ifdefDEBUG_DI
     if (debug_flag) {
        printf ("bytes_avail A1 = %d\n", bytes_avail);
     }
#endif
     bytes_avail = bytes_avail - (INT16) received;
                   /* Reset count of the # bytes available
*/
#ifdef DEBUG_DI
     if (debug_flag) {
       printf ("bytes_avail A2 = %d\n", bytes_avail);
     }
#endif
     pScanBuffer = &ScanBuffer[0];
     status = OKAY;
   } /* if(..) */
   if (bytes_avail == SCAN_BUFSIZE) break;
   /* Fill appropriate input scan buffer */
   if (cur_view == 0)
   {
      status = CopyScanLine (Compression_view0, WidthBytes_view0,
              &pScanBuffer, &bytes_avail, &pBufferView0
,
              LengthView0, pReceivedView0);
   }
   else /* cur_view == 1 */
   {
     status = CopyScanLine (Compression_view1, WidthBytes_view1,
             &pScanBuffer, &bytes_avail, &pBufferView1
,
             LengthView1, pReceivedView1);
   }
   /* Switch (compute) next image to process (either view 0 or 1) */
   if( (status != SCANBUFEMPTY) && (status != OUTBUFFERFULL) &&
      (status != SL_SCANERROR))
   {
#ifdef VORTEX_WORKAROUND
     --view_count[cur_view];
     if (view_count[cur_view] == 0)
     {
        view_count[cur_view] = imageratio[cur_view];
#else
     ++view_count[cur_view];
     if (view_count[cur_view] == imageratio[cur_view])
     {
        view_count[cur_view] = 0;
#endif
        cur_view = ((cur_view + 1) % 2);
```

APPENDIX A

```
        }
      }
    } /* while () */
#ifdef DEBUG_DI
    if (debug_flag)
      printf("[DualScan] status = %d; bytes_avail A3 = %d\n", status, bytes_avail);
#endif
    /* Test if Decompression engine needs more data to finish a */
    /* line but the scanner had no data to send         */
    if ( ((status == SCANBUFEMPTY) && (received == 0)) ||
         (status == SL_SCANERROR))
        status = SL_SCANERROR;
    else    status = OKAY;
  } /* if(..) */
  return status;
} /* DualScan */
static INT16 FP CopyScanLine (INT16 Compression, INT16 WidthBytes,
                PUINT8 *ScanBuffer, PINT16 bytes_avail,
                PUINT8 *pBuffer, INT32 Length, PINT32 pReceived)
/*
** Parameters:
**    Compression Input scan data compression flag.
**    WidthBytes Width of single scan line in bytes.
**    ScanBuffer Pointer to a pointer containing the current byte within
**        scan input buffer. [On exit -- the indirectly referenced
**        byte pointer is set to the address of the byte immediately
**        following last byte processed from the input buffer.]
**    bytes_avail Pointer to the number of bytes available (or free) in the
**        input buffer. (This argument will always be equal to
**        SCAN_BUFSIZE the first time this function is called.)
**        [On exit -- this counter is incremented by the number of
**        input bytes successfully processed by this routine.]
**    pBuffer  Pointer to a pointer containing the current position
**        within the output buffer where processed data is to be
**        stored. [On exit -- the indirectly referenced byte
**        pointer is set to the address of the the next byte to
**        be added to the output buffer.]
**    Length       Total size (in bytes) of output buffer, 'pBuffer'. (Note,
**        this is the total length of 'pBuffer' and NOT the number
**        of free bytes remaining in the buffer.)
**    pReceived    Pointer to the actual number of bytes found in the output
**        buffer, pointed to by 'pBuffer'. [On exit -- this counter
**        contains the total number of bytes currently found in the
**        output buffer.]
**
** Globals:      None.
** Operation:    This private function copies a single scan line of data
**   from the input buffer, 'ScanBuffer', to the output buffer, 'pBuffer'.
**
**    [Refer to the internal documentation for the "Scan()" and
**    "DualScan()" functions for additional usage information!]
**
** Return:
**    status       OKAY, output buffer successfully filled.
**                 SCANBUFEMPTY, input raw scan buffer is empty (input buffer
**                     does not have enough data for one single
**                     complete scan line).
**                 OUTBUFFERFULL, output scan buffer contained processed
**                     data (unpacked "dual image" and/or
**                     decompressed data) is full (similar to the
**                     above, output buffer does not contain
**                     enough space to hold a new single complete
**                     scan line).
*/
{
  INT16 status = OKAY;     /* Return value from this function */
                /* (default = OKAY)      */
  /*
   * Check if there is enough room in the output buffer to store a complete
   * single scan line of data.
   */
  if((*pReceived + WidthBytes) > Length)
    status = OUTBUFFERFULL;
  else {               /* Output buffer NOT full! */
    if(!Compression) {         /* UnCompressed data */
      /*
       * Check if the input buffer contains enough raw data for
```

APPENDIX A

```
         * one full scan line.
         */
        if((SCAN_BUFSIZE - *bytes_avail) < WidthBytes)
            status = SCANBUFEMPTY;
        else {        /* Everything OK -- now copy the data */
            memmove ((PUINT8) *pBuffer, (PUINT8) *ScanBuffer, WidthBytes);
            *ScanBuffer += WidthBytes;
            *bytes_avail += WidthBytes;
            *pBuffer += WidthBytes;
        }
      }
      else {                         /* Compressed data */
         /* Decompress single scan line of raw data */
         status = Decomp(ScanBuffer, bytes_avail, WidthBytes,
                    pBuffer);
      } /* if() else */
      if (status == OKAY) {
        *pReceived += WidthBytes;
      }
    }
    return status;
} /* CopyScanLine */
```

What is claimed is:

1. A computer operable method for scanning, said method comprising the following steps:

(a) designating a number of renditions of a single view to be simultaneously created from a single scan by a single scanner, wherein the number of renditions is greater than one;

(b) designating a data type and other parameters for each of the number of designated renditions to be simultaneously created from said single scan;

(c) simultaneously creating a data signal representative of each of the number of renditions designated to be created from said single scan; and (d) sending each of the data signals from said scanner to a host computer.

2. The computer operable method for scanning of claim 1, wherein said computer operable method is implemented in scanner command language.

3. A scanner comprising:

(a) a means for designating a number of renditions of a single view to be simultaneously created from a single scan by said scanner, wherein the number of renditions is greater than one;

(b) a means for designating a data type and other parameters for each of the number of designated renditions to be simultaneously created from said single scan;

(c) a means for simultaneously creating a data signal representative of each of the number of renditions designated to be created from said single scan; and (d) a means for sending each of the data signals from said scanner to a host computer.

* * * * *